US010562612B2

(12) United States Patent
Honnorat et al.

(10) Patent No.: US 10,562,612 B2
(45) Date of Patent: Feb. 18, 2020

(54) AIRCRAFT CONTROL DEVICE, A CORRESPONDING AIRCRAFT, AND A METHOD OF CONTROLLING AN AIRCRAFT

(71) Applicant: AIRBUS HELICOPTERS, Marignane (FR)

(72) Inventors: Olivier Honnorat, Aix en Provence (FR); Romain Nevers, Pelissanne (FR); Romain Kovel, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 322 days.

(21) Appl. No.: 15/723,322

(22) Filed: Oct. 3, 2017

(65) Prior Publication Data
US 2018/0093757 A1 Apr. 5, 2018

(30) Foreign Application Priority Data

Oct. 3, 2016 (FR) ...................... 16 01430

(51) Int. Cl.
*B64C 13/46* (2006.01)
*B64C 13/04* (2006.01)
(Continued)

(52) U.S. Cl.
CPC .............. *B64C 13/46* (2013.01); *B64C 13/04* (2013.01); *B64C 13/0421* (2018.01);
(Continued)

(58) Field of Classification Search
CPC ......... B64C 13/46; B64C 13/04; B64C 27/56; H02P 23/14; H02P 21/20; H02P 21/18;
(Continued)

(56) References Cited

U.S. PATENT DOCUMENTS 7,108,232 B2    9/2006  Hoh
8,942,866 B2 *  1/2015  Shue ...................... G05D 1/102
                                                    244/158.1

(Continued)

FOREIGN PATENT DOCUMENTS

FR    2718102 A1    10/1995
FR    2989353 A1    10/2013

OTHER PUBLICATIONS

French Search Report for French Application No. FR 1601430, Completed by the French Patent Office, dated Jun. 13, 2017, 7 pages.

*Primary Examiner* — Kawing Chan
*Assistant Examiner* — Bradley R Brown
(74) *Attorney, Agent, or Firm* — Brooks Kushman P.C.

(57) ABSTRACT

A control device for controlling an aircraft, the control device including at least one motor-driven trim actuator with active type anchoring, the trim actuator including at least one electric motor, at least one electronic power circuit for electrically powering the electric motor(s), and speed reduction means for driving rotation of an outlet shaft of the trim actuator. The control device implements three distinct servo-control loops that are nested in one another, these three servo-control loops being formed by an electric current servo-control loop, a speed servo-control loop, and a force servo-control loop.

16 Claims, 3 Drawing Sheets

(51) Int. Cl.
  *B64C 27/56* (2006.01)
  *H02P 23/14* (2006.01)
  *H02P 21/14* (2016.01)
  *H02P 21/20* (2016.01)
  *H02P 21/18* (2016.01)
  *H02P 21/13* (2006.01)
  *G05B 19/402* (2006.01)
  *B64C 13/50* (2006.01)

(52) U.S. Cl.
  CPC ............ *B64C 13/50* (2013.01); *B64C 13/507* (2018.01); *B64C 27/56* (2013.01); *G05B 19/402* (2013.01); *H02P 21/13* (2013.01); *H02P 21/141* (2013.01); *H02P 21/18* (2016.02); *H02P 21/20* (2016.02); *H02P 23/14* (2013.01); *G05B 2219/34013* (2013.01)

(58) Field of Classification Search
  CPC .................. H02P 21/13; H02P 21/141; G05B 2219/34013; G05B 19/402
  See application file for complete search history.

(56) References Cited

U.S. PATENT DOCUMENTS

| | | | |
|---|---|---|---|
| 9,284,044 B2 * | 3/2016 | Beggiora | G06F 3/016 |
| 2005/0080495 A1 * | 4/2005 | Tessier | B64C 13/503 |
| | | | 700/63 |
| 2016/0221674 A1 | 8/2016 | Latham et al. | |
| 2016/0304190 A1 * | 10/2016 | Grohmann | B64C 13/22 |

* cited by examiner

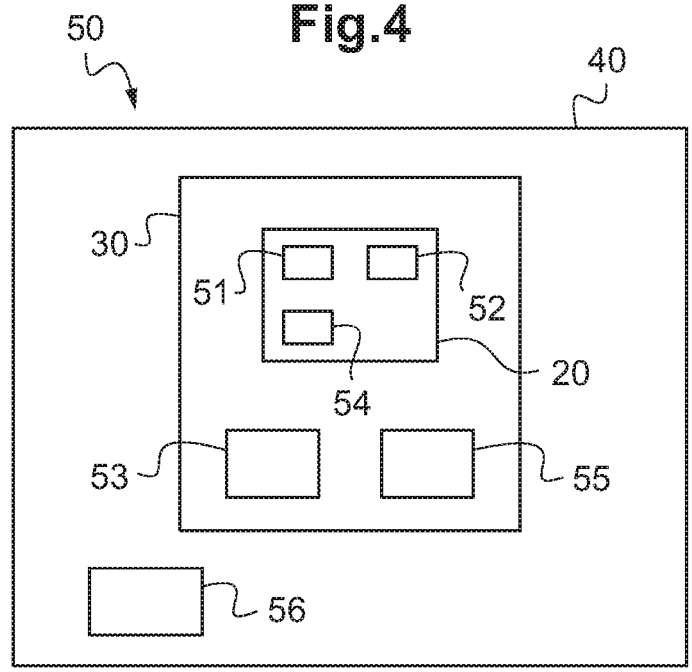

AIRCRAFT CONTROL DEVICE, A CORRESPONDING AIRCRAFT, AND A METHOD OF CONTROLLING AN AIRCRAFT

CROSS-REFERENCE TO RELATED APPLICATIONS

This application claims priority to French patent application No. FR 16 01430 filed on Oct. 3, 2016, the disclosure of which is incorporated in its entirety by reference herein.

BACKGROUND OF THE INVENTION (1) Field of the Invention

The present invention relates to a control device for controlling an aircraft, to such an aircraft fitted with a control device of this type, and to a corresponding control method enabling a pilot to control an aircraft, e.g. such as an airplane or a rotorcraft.

The invention seeks more particularly to provide a control device in which a trim actuator is placed in parallel in a main control linkage serving to control aerodynamic means of an aircraft. The trim actuator constitutes in particular a system for providing the pilot with assistance by making it easier to hold a control member in a determined position.

Specifically, such an aircraft also includes at least one control member that is to be moved by at least one pilot in order to move aerodynamic means.

(2) Description of Related Art

Thus, below in the present application, the term "control member" is used to designate any control device that can be moved by a pilot or automatically, whether in a cockpit or outside the aircraft if the aircraft does not have a pilot on board. Such control members may thus present various forms and in particular they may be in the form of a lever, a stick, a mini-stick or "joystick", or indeed pedals.

Such control members then serve to move aerodynamic means relative to an air stream that is incident on a fuselage of the aircraft. In an airplane, such aerodynamic means may then consist by way of example either in flaps, ailerons, or wing spoilers, or else by way of example in a rudder of a tail fin or an elevator.

In a rotorcraft, such aerodynamic means may nevertheless correspond by way of example to a collective pitch angle or cyclic pitch angle for the blades of a main rotor and to a collective pitch angle in particular for the blades of a tail rotor, for example.

Furthermore, an aircraft generally includes a plurality of trim actuators for controlling a plurality of aerodynamic means. Such trim actuators may then be of the "anchored motor-driven" type so as to generate an opposing force in a control member of the aircraft on the basis of an opposing torque generated by at least one electric motor of the trim actuator. Furthermore, such trim actuators may also be of the active type: under such circumstances, the force gradient of the opposing torque generated by the electric motor(s) may vary with a varying "anchor" position of the trim actuator.

Furthermore, in order to control such a trim actuator, it is necessary to servo-control a control setpoint for the electric motor(s) in such a manner as to guarantee optimum operation of the various members.

For this purpose, and as described in particular by the following documents: FR 2 718 102; FR 2 989 353; US 2016/0221674; U.S. Pat. No. 8,942,866; US 2005/0080495; and U.S. Pat. No. 7,108,232; control devices have been developed that include in particular a so-called "force" servo-control loop for controlling the electric motor(s) of the trim actuator. Under such circumstances, such servo-control loops are implemented by means of force sensors measuring a force exerted on a control linkage of the control member. In this way, it becomes possible to adapt the control setpoint for the electric motor as a function of the measured force acting on the control linkage of the control member. The force servo-control loop is then generally combined with an electric current servo-control loop in order to generate the control setpoint for the electric motor(s) of the trim actuator.

Nevertheless, such control devices do not make dynamic anchoring possible for a series actuator arranged in series with the main control linkage for controlling the aerodynamic means of the aircraft. Specifically, any variation in the position of a control member automatically gives rise to a variation in its travel speed and thus in the speed of an outlet shaft or of an outlet lever of the trim actuator. This speed variation is thus not taken into account by such control devices, which can be problematic, giving rise to jolting in the control member.

Furthermore, the motor(s) of a trim actuator of that type of control device is/are then the subject of servo-control that is not very robust, and in any event is not optimum.

BRIEF SUMMARY OF THE INVENTION

An object of the present invention is thus to propose a control device making it possible to overcome the above-mentioned limitations by means of servo-control that is more robust for the motor(s) of the trim actuator. The control device also makes it possible to provide series actuators with dynamic anchoring by taking account of variations in the travel speed of the control members of the aircraft.

The invention thus provides a control device for controlling an aircraft, the control device comprising at least one motor-driven trim actuator of active type, the trim actuator including at least one electric motor, at least one electronic power circuit for electrically powering the electric motor(s), and speed reduction means for reducing the speed of rotation of an axis of rotation of an electric motor. In addition, such speed reduction means serve to drive rotation of an outlet shaft of the trim actuator at an outlet speed of rotation that is less than an inlet speed of rotation of the axis of rotation of the electric motor(s).

The control device is remarkable in that it implements three distinct servo-control loops that are nested in one another, the three servo-control loops being formed by an electric current servo-control loop, a speed servo-control loop, and a force servo-control loop.

The electric current servo-control loop then includes at least one electric current sensor arranged at the input(s) of the electric motor(s) in order to measure an electric power supply current delivered by the electronic power circuit(s). Such an electric current servo-control loop also includes at least one first position sensor arranged on the axis of rotation of the electric motor(s) in order to measure an angular position of the axis of rotation relative to a stationary frame of the trim actuator.

The speed servo-control loop includes at least one second position sensor arranged on the outlet shaft of the trim actuator to measure an angular position of the outlet shaft relative to the stationary frame of the trim actuator. Such a speed servo-control loop also includes an output branch connected to an input of the electric current servo-control loop.

Finally, the force servo-control loop comprises at least one force sensor arranged at at least one flight control member to measure an external force exerted on the flight control member(s). Furthermore, the force servo-control loop also includes an output line connected to an input of the speed servo-control loop.

In other words, the second position sensor serves to measure the speed of variation in the position of the control member(s). The speed servo-control loop can then act via a comparator/subtracter to generate an order that is opposite to the order generated by the electric current servo-control loop.

Such a speed servo-control loop nested with the electric current servo-control loop and the force servo-control loop then enables the series actuator(s) of the aircraft to be anchored dynamically.

Furthermore, the speed servo-control loop also makes it possible to control the travel speed of the anchor point via an autopilot device of the aircraft. Specifically, the speed servo-control loop then serves to achieve "fluid" control over the setpoint that generates an anchor position, also known as the "zero force position" for the flight control member(s).

The speed servo-control loop thus serves to avoid rotary oscillations of the outlet shaft of the trim actuator relative to its stationary frame, which would lead to jolting of jerking in the flight control member(s). Specifically, a speed servo-control loop then serves to take into consideration the internal clearances in the speed reduction means of the trim actuator and/or the internal clearances in the main control linkages for controlling the aerodynamic means of the aircraft. Specifically, such clearances must not be perceived by the pilot while operating the flight control member(s).

Advantageously, the electric motor(s) may be of the three-phase type and the electric current servo-control loop may have three electric current sensors each measuring a respective value of an electric power supply current delivered by the electronic power circuit(s).

In other words, on each of the three phases of the motor(s), an electric current sensor measures the variations in the magnitude of the signal. The electric motor(s) may in particular be of the brushless type.

In practice, the control device may include at least one computer for performing a vector control method for the three-phase electric motor(s), such a vector control method serving to deliver two orthogonal components: a first component representative of a setting for a magnetic flux of the electric motor(s), and a second component representative of a setting for a motor torque of the electric motor(s).

In this way, the electric motor(s) may be servo-controlled while avoiding generating torque undulations created by the way the associated electronic circuit is controlled. Specifically, each phase ought normally to be controlled by means of a sinewave and synchronized with a phase shift of 120 degrees relative to the other two phases. Such control requires a large passband involving high-grade electronics having very great computation power.

Nevertheless, such electronics cannot be envisaged for a very compact onboard system that is to be installed in an aircraft. The vector control method then serves to provide another mode of controlling the electric current in each phase of the electric motor(s).

Specifically, prior to implementing a state value in a regulator, trigonometric transformations are used to transform the three-phase system having three electric currents into a two-phase system having two electric currents as a function of the position of the rotor of each electric motor. Thus, a notional system is generated of electric currents in a complex plane having a real current Id and an imaginary current Iq. Since the real current Id is maintained at the value 0, it is only the value of the imaginary current Iq that is then controlled.

In this way, a constant value is obtained for the phase differences between the phases. The three-phase system is thus simplified and is reduced to a single phase system with a single state value Iq that is to be controlled. Under such circumstances, servo-controlling the single imaginary current value Iq becomes very easy. Once this imaginary current is servo-controlled, e.g. by means of a subtracter and a proportional integral regulator, the inverse trigonometrical transforms are calculated so as to deduce therefrom the control electric currents for application to the terminals of the electric motor(s).

In an embodiment of the invention, the speed servo-control loop may include a calculation circuit using a first signal representative of the angular position of the outlet shaft of the trim actuator to determine a second signal representative of a speed of rotation of the outlet shaft.

Thus, the differentiated signal can then be filtered in order to eliminate alternations and digital noise due to the differentiation. In particular, such a filter may be a so-called "moving average" filter, e.g. serving to eliminate frequencies greater than 80 hertz (Hz). In an embodiment, the passband of the speed servo-control loop may then lie in the range 50 Hz to 80 Hz.

Finally, in application of a performance-limiting and safety strategy for the trim actuator, a limiter type device may be used to limit the speed setpoint output by the speed servo-control loop to some maximum value.

Advantageously, the electric current servo-control loop may include at least one first filter serving to eliminate interfering frequencies from a signal representative of the angular position of the axis of rotation of the electric motor(s).

Specifically, the electric current measurements given by the electric current sensors may be disturbed by interfering electromagnetic fields. The signals are therefore filtered at about 2 kilohertz (kHz) so as to eliminate disturbances such as those coming from the electronic power circuit used for electrically powering the motor(s). A switching frequency of the first filter(s) then lies in the range 10 kHz to 20 kHz.

Consequently, the passband of the electric current servo-control loop is set in the range 500 Hz to 1 kHz.

Likewise, the speed servo-control loop may include at least one second filter serving to eliminate interfering frequencies from a signal representative of the angular position of the outlet shaft of the trim actuator.

In other words, prior to being differentiated, the signal from the second position sensor on the outlet shaft may be filtered a first time in the range 500 Hz to 1 kHz in order to eliminate electromagnetic noise, in particular the switching frequency of a power bridge, which generally lies in the range 10 kHz to 20 kHz, and then a second time in the range 100 Hz to 150 Hz in order to limit and adapt the passband of the speed servo-control loop.

In an embodiment of the invention, the force sensor(s) may be arranged mechanically in series relative to the flight control member(s).

Such sensors may thus each serve to perform respective simultaneous and redundant measurements of the force transmitted to the flight control member(s).

Advantageously, the force servo-control loop may include a memory serving to store at least one table of predetermined force values for application to the flight control member(s) as a function of position data transmitted by the second position sensor(s) of the speed servo-control loop.

Thus, the second position sensor gives an angular position for the outlet shaft relative to the stationary frame of the trim actuator. This angular position corresponds to a theoretical force to be obtained at the control member(s). This theoretical force is then given by the table of predetermined force values previously stored in the memory.

This table thus defines the theoretical force relationships that is to be obtained. Thereafter, the theoretical force is compared with the force measured by the force sensor, and then the difference between the theoretical force and the measured force is servo-controlled, e.g. by using a proportional integral regulator. The output value thus serves to control the input of the speed servo-control loop.

As mentioned above, the invention also provides an aircraft remarkable in that it includes a control device as described above.

Finally, the present invention also provides a control method for controlling an aircraft including at least one motor-driven trim actuator with active type anchoring, the trim actuator including at least one electric motor, at least one power electronic circuit for electrically powering the electric motor(s), and speed reduction means for reducing the speed of rotation of an axis of rotation of the electric motor(s), the speed reduction means serving to drive rotation of an outlet shaft of the trim actuator at an outlet speed of rotation that is less than an inlet speed of rotation of the axis of rotation of the electric motor(s)

Such a control method is then remarkable in that it comprises three distinct servo-control loops that are nested in one another, the three servo-control loops being formed by an electric current servo-control loop, a speed servo-control loop, and a force servo-control loop, and wherein:
  in the electric current servo-control loop:
    at least one electric current sensor is used at the input(s) of the electric motor(s) to measure the value(s) of electric power supply current(s) delivered by the electronic power circuit(s); and
    at least one first position sensor is used on the axis of rotation of the electric motor(s) to measure the angular position(s) of the axis (axes) of rotation relative to a stationary frame of the trim actuator;
  in the speed servo-control loop:
    at least one second position sensor is used on the outlet shaft to measure an angular position of the outlet shaft relative to the stationary frame of the trim actuator; and
    an output branch is connected with an input of the electric current servo-control loop; and
  in the force servo-control loop:
    at least one force sensor is used at at least one flight control member to measure the external force(s) exerted on the flight control member(s); and
    an output line is connected with an input of the speed servo-control loop.

Such a control method then serves in particular to obtain dynamic anchoring of the series actuator(s) of the aircraft.

Furthermore, the electric motor(s) may be of the three-phase type and the electric current servo-control loop may include a measurement step using three electric current sensors to measure three values of electric power supply current delivered by the electronic power circuit(s).

In practice, at least one computer may be used to perform a vector control step for the three-phase electric motor(s), such a vector control step serving to deliver two orthogonal components: a first component representative of a setting for a magnetic flux of the electric motor(s), and a second component representative of a setting for a motor torque of the electric motor(s).

Advantageously, the speed servo-control loop may include a calculation step making use of a calculation circuit having as input a first signal representative of the angular position of the outlet shaft of the trim actuator to determine a second signal representative of a speed of rotation of the outlet shaft.

In practice, the electric current servo-control loop may include a first filtering step using at least one first filter to eliminate interfering frequencies from a signal representative of the angular position of the axis of rotation of the electric motor(s).

Likewise, by analogy, the speed servo-control loop may include a second filtering step using at least one second filter to eliminate interfering frequencies from a signal representative of the angular position of the outlet shaft of the trim actuator.

Finally, in an implementation, the force servo-control loop may include a storage step serving to store at least one table of predetermined force values for application to the flight control member(s) as a function of position data transmitted by the second position sensor(s) of the speed servo-control loop.

BRIEF DESCRIPTION OF THE DRAWINGS

The invention and its advantages appear in greater detail from the context of the following description of examples given by way of illustration and with reference to the accompanying figures, in which:

FIG. 4 is a block diagram of the control method in accordance with the invention.

DETAILED DESCRIPTION OF THE INVENTION

Elements present in more than one of the figures are given the same references in each of them.

Figure 1:
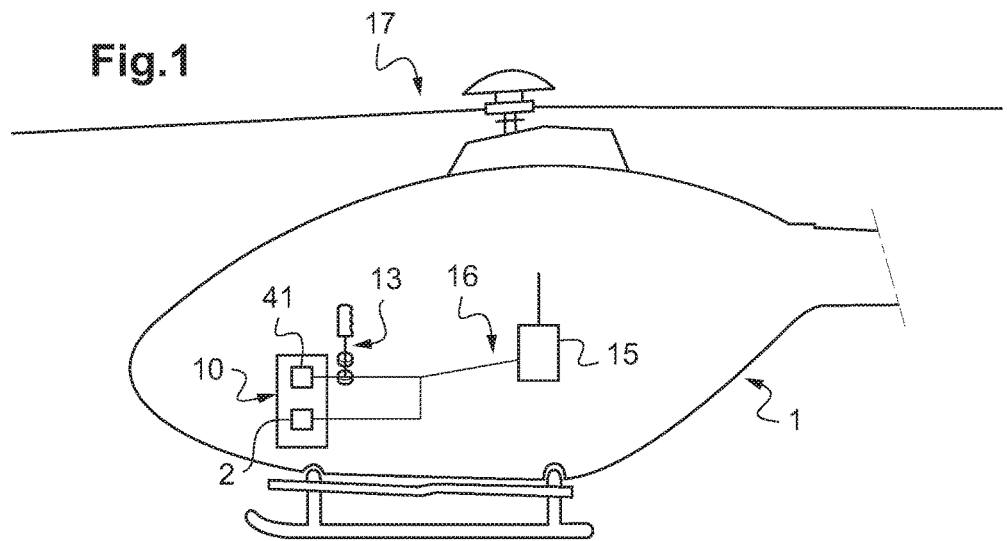
FIG. 1 is a diagrammatic side view of an aircraft in accordance with the invention.

As mentioned above, the invention relates to an aircraft 1, e.g. in the form of a rotorcraft, as shown in FIG. 1.

Such an aircraft 1 then has at least one motor-driven trim actuator 2 with active type anchoring. Such a trim actuator 2 then serves in particular to control an anchor position for a flight control member 13, e.g. represented in the form of a cyclic pitch stick for controlling the cyclic pitch of the blades of a rotor, or a collective pitch lever for controlling the collective pitch of the blades, or indeed pedals. In addition, such an aircraft 1 also has a control device 10 for servo-controlling the control setpoint of at least one electric motor of the trim actuator 2.

Furthermore, this servo-control of the control setpoint for the electric motor of the trim actuator 2 enables at least one "series" actuator 15 to be anchored dynamically. The series actuator(s) 15 is/are arranged in series relative to the main control linkage 16 enabling aerodynamic means 17 of the aircraft 1 to be controlled. As shown for a rotorcraft, these aerodynamic means 17 may be formed by blades of a rotor for which it is possible to modify a cyclic pitch or a collective pitch in order to control the aircraft 1.

Figure 2:
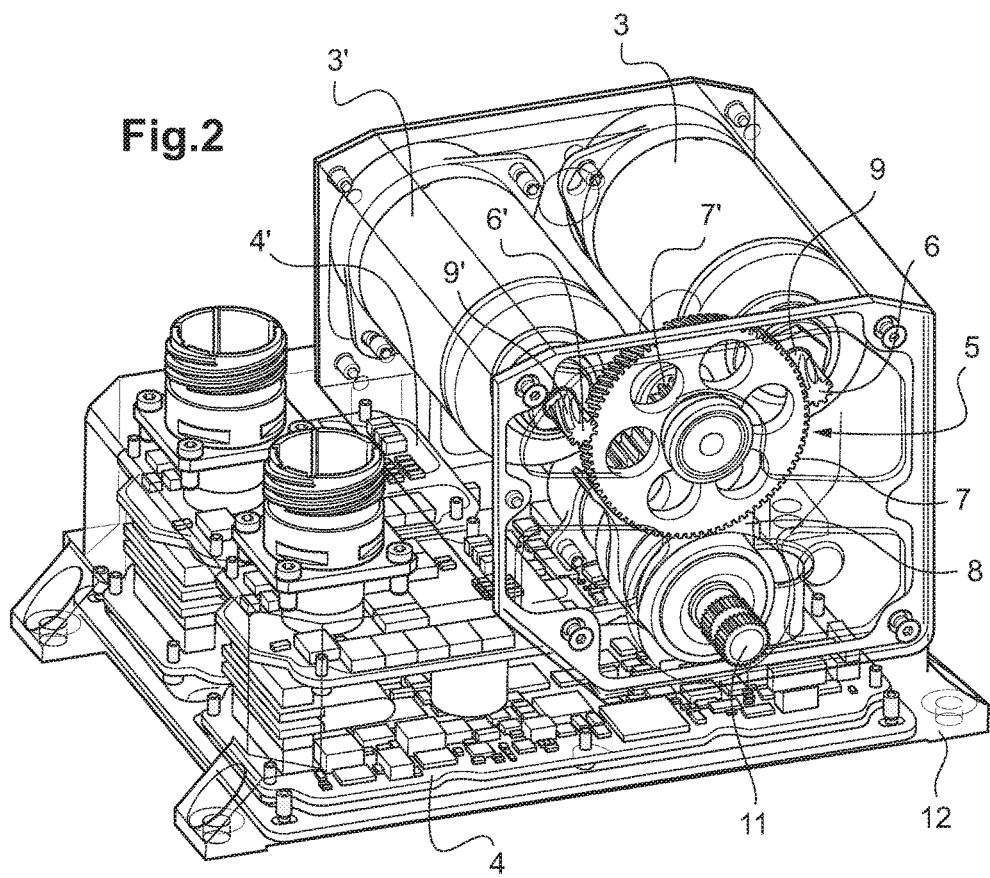
FIG. 2 is a perspective view of a trim actuator fitted to an aircraft in accordance with the invention.

As shown in FIG. 2, such a trim actuator 2 may have two electric motors 3 and 3' each having a respective axis of rotation 9, 9', speed reduction means 5, and an outlet shaft 11 that is movable in rotation relative to a frame 12 of the trim actuator 2.

Such electric motors 3, 3' are then each electrically powered by a respective electronic power circuit 4, 4'. These two electronic power circuits 4, 4' are mounted on the frame 12 of the trim actuator 2 and they serve in particular to provide redundancy for controlling the rotary movement of the outlet shaft 11 of the trim actuator 2.

Furthermore, the speed reduction means 5 serve to reduce the speed of rotation of the two electric motors 3, 3' so that the speed of rotation of the outlet shaft 11 is less than the speed of rotation of the two electric motors 3, 3'.

By way of example, such speed reduction means 5 may thus comprise a train of gearwheels 6, 6', 7, 7' together with a part 8 having teeth over a fraction thereof and secured to the outlet shaft 11 without any freedom to move relative thereto.

Figure 3:
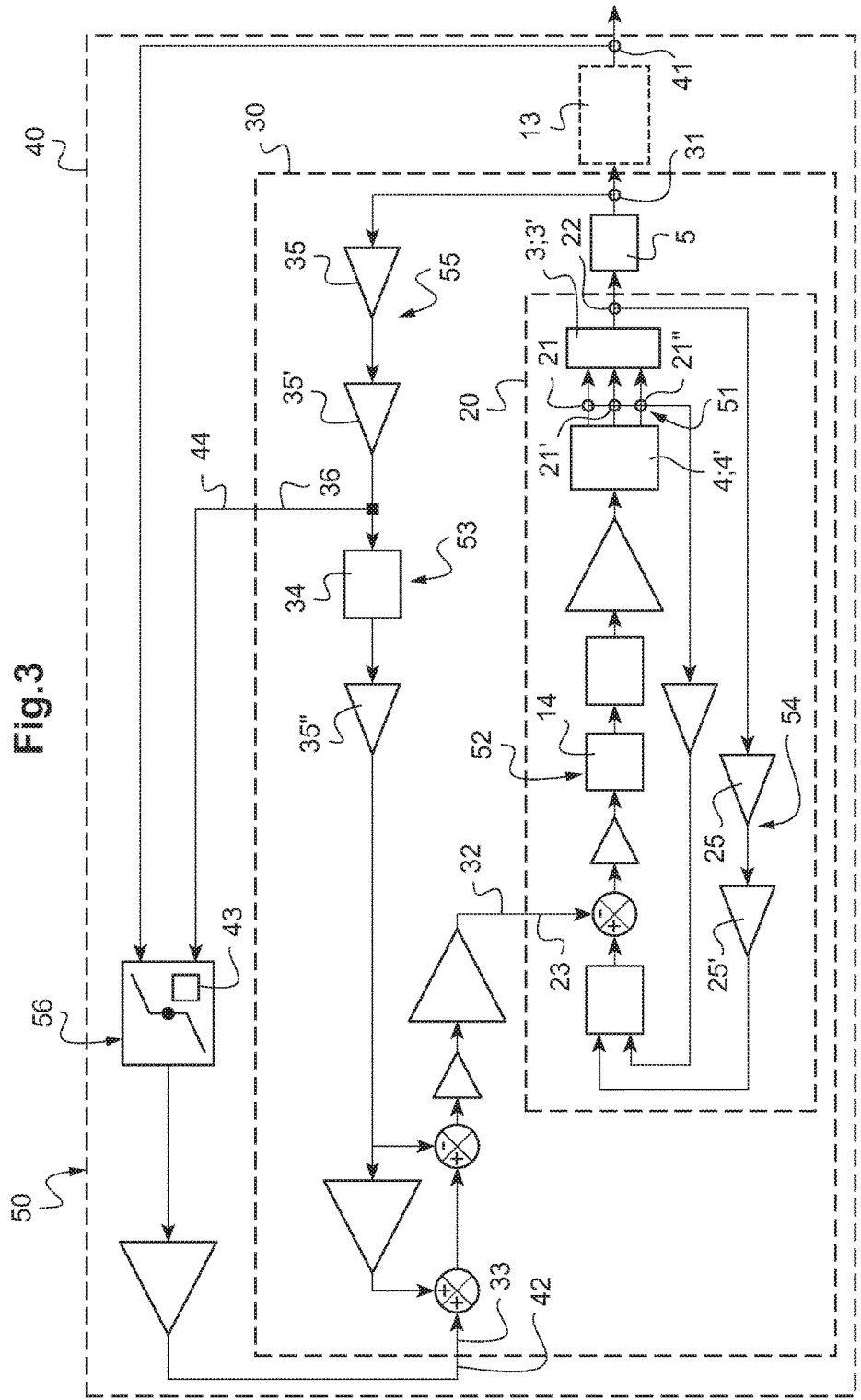
FIG. 3 is a block diagram of the control device and the control method in accordance with the invention.

Consequently, and as shown in FIG. 3, the control device 10 makes use of three distinct servo-control loops that are nested in one another. These three servo-control loops of a control method 50 are thus formed by an electric current servo-control loop 20, a speed servo-control loop 30, and a force servo-control loop 40.

By way of example, such an electric current servo-control loop 20 may have three electric current sensors 21, 21', and 21" arranged at the input of each of the phases of an electric motor 3, 3' of three-phase type. These three electric current sensors 21, 21', 21" then serve to measure respective electric current values of the three-phase power supply delivered by one of the electronic power circuits 4, 4'.

Furthermore, the electric current servo-control loop 20 also includes a first position sensor 22 arranged on the axis of rotation 9, 9' of the electric motor 3, 3'. Such a first position sensor 22 thus serves to measure an angular position of the axis of rotation 9, 9' relative to the stationary frame 12 of the trim actuator 2.

Furthermore, the control device 10 may include a computer 14 serving to implement a vector control method for the three-phase electric motor 3, 3'. This vector control method thus makes it possible to deliver two orthogonal components: a first component representative of a setting for a magnetic flux of the electric motor 3, 3', and a second component representative of a setting for a motor torque of the electric motor 3, 3'.

Under such circumstances, the control method 50 then includes a measurement step 51 of measuring the three electric current values of the power supplied by the power supply circuit 4, 4' to the electric motor 3, 3', and a vector control step 52.

Furthermore, the electric current servo-control loop 20 may also include two first filters 25, 25' serving to eliminate interfering frequencies from a signal representative of the angular position of the axis of rotation 9, 9' of the electric motor 3, 3'.

Under such circumstances, the control method 50 also includes a first filtering step 54 acting via the two first filters 25, 25' to eliminate interfering frequencies from a signal representative of the angular position of the axis of rotation 9, 9' of the electric motor 3, 3'. By way of example, the electric current servo-control loop 20 may have a first filter 25 of analog type arranged in series upstream from a first filter 25' of digital type.

In addition, the speed servo-control loop 30 includes a second position sensor 31 arranged on the outlet shaft 11 so as to measure the angular position of the outlet shaft 11 relative to the stationary frame 12 of the trim actuator 2.

As shown, the speed servo-control loop 30 may then have two second filters 35, 35' serving to eliminate interfering frequencies from the signal representative of the angular position of the outlet shaft 11 as delivered by the second position sensor 31.

Under such circumstances, the control method 50 also includes a second filtering step 55 serving via the two second filters 35, 35' to eliminate interfering frequencies from a signal representative of the angular position of the outlet shaft 11. For example, the speed servo-control loop 30 may include a second filter 35 of analog type arranged in series upstream from a second filter 35' of digital type.

Furthermore, the speed servo-control loop 30 may also include an output branch 36 connected to an input 44 of the force servo-control loop 40.

In addition, the speed servo-control loop 30 may include a calculation circuit 34 for using a first signal representative of the angular position of the outlet shaft 11 to determine a second signal representative of a speed of rotation of the outlet shaft 11.

Under such circumstances, the control method 50 then includes a calculation step 53 using as input the first signal representative of the angular position of the outlet shaft 11.

In a particular embodiment, such a calculation circuit 34 may be a differentiator circuit serving to differentiate the first signal representative of the angular position of the outlet shaft 11. By analogy, the calculation step 53 under such circumstances may correspond to a step of differentiating the first signal representative of the angular position of the outlet shaft 11.

The speed servo-control loop 30 may also include a third filter 35" of digital type for eliminating potential interfering frequencies from a signal representative of a speed of rotation of the outlet shaft 11 of the trim actuator 2 relative to the stationary frame 12 of the trim actuator 2.

Finally, the speed servo-control loop 30 also includes an output branch 32 connected to an input 23 of the electric current servo-control loop 20 in order to regulate continuously the speed of the electric motor 3. Such a speed servo-control loop 30 then serves both to anchor the series actuators 15 of the aircraft 1 dynamically and also to provide speed control for the value of an anchor point delivered by a device of the autopilot type.

Furthermore, the force servo-control loop 40 includes a force sensor 41 arranged at the flight control member 13 and serving to measure an external force exerted on the flight control member 13.

In practice, the force servo-control loop 40 may include a memory 43 for performing a storage step 56 of storing at least one table of predetermined force values to be applied to the flight control member 13. The theoretical force data is then determined as a function of position data for the outlet shaft 11 as transmitted by the second position sensor 31 via the output branch 36 connected to the input 44 of the force servo-control loop 40.

Finally, the force servo-control loop 40 includes an output line 42 connected to an input 33 of the speed servo-control loop 30 in order to control the speed servo-control loop 30.

As shown in simplified form in FIG. 4, the control method 50 has three servo-control loops formed by an electric current servo-control loop 20, a speed servo-control loop 30, and a force servo-control loop 40.

The electric current servo-control loop 20 then includes in particular the measurement step 51 for measuring the electric current delivered by the electronic power circuit 4, 4' to power the electric motor 3, 3'.

The electric current servo-control loop 20 also includes a vector control step 52 as described above and the first filtering step 54 for filtering the signal coming from the angular position of the axis of rotation 9, 9' of the electric motor 3, 3'.

The speed servo-control loop 30 includes firstly the electric current servo-control loop 20 and secondly both the differentiating step 53 for differentiating the signal representative of the angular position of the axis of rotation 9, 9' of the electric motor 3, 3', and also the second filtering step 55 for filtering the signal representative of the angular position of the outlet shaft 11 of the trim actuator 2 relative to the stationary frame 12 of the trim actuator 2.

Finally, the force servo-control loop 40 includes firstly the speed servo-control loop 30 and secondly the storage step 56 for storing at least one table of predetermined force values for application to the flight control member 13.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A control device for controlling an aircraft, the control device comprising at least one motor-driven trim actuator of active type, the trim actuator including at least one electric motor, at least one electronic power circuit for electrically powering the at least one electric motor, and speed reduction means for reducing the speed of rotation of an axis of rotation of the at least one electric motor, the speed reduction means serving to drive rotation of an outlet shaft of the trim actuator at an outlet speed of rotation that is less than an inlet speed of rotation of the axis of rotation of the at least one electric motor, wherein the control device implements three distinct servo-control loops that are nested in one another, the three servo-control loops being formed by an electric current servo-control loop, a speed servo-control loop, and a force servo-control loop, and wherein:
   the electric current servo-control loop comprises:
      at least one electric current sensor arranged at the input of the at least one electric motor in order to measure an electric power supply current delivered by the at least one electronic power circuit; and
      at least one first position sensor arranged on the axis of rotation of the at least one electric motor in order to measure an angular position of the axis of rotation relative to a stationary frame of the trim actuator;
   the speed servo-control loop comprises:
      at least one second position sensor arranged on the outlet shaft of the trim actuator to measure an angular position of the outlet shaft relative to the stationary frame of the trim actuator; and
      an output branch connected to an input of the electric current servo-control loop; and
   the force servo-control loop comprises:
      at least one force sensor arranged at least one flight control member to measure an external force exerted on the at least one flight control member; and
      an output line connected to an input of the speed servo-control loop.

2. The device according to claim 1, wherein the at least one electric motor is of three-phase type and the electric current servo-control loop has three electric current sensors each measuring a respective value of an electric power supply current delivered by the at least one electronic power circuit.

3. The device according to claim 2, wherein the control device includes at least one computer for performing a vector control method for the at least one three-phase electric motor, such a vector control method serving to deliver two orthogonal components: a first component representative of a setting for a magnetic flux of the at least one electric motor, and a second component representative of a setting for a motor torque of the at least one electric motor.

4. The device according to claim 1, wherein the speed servo-control loop includes a calculation circuit using a first signal representative of the angular position of the outlet shaft of the trim actuator to determine a second signal representative of a speed of rotation of the outlet shaft.

5. The device according to claim 1, wherein the electric current servo-control loop includes at least one first filter serving to eliminate interfering frequencies from a signal representative of the angular position of the axis of rotation of the at least one electric motor.

6. The device according to claim 1, wherein the speed servo-control loop includes at least one second filter serving to eliminate interfering frequencies from a signal representative of the angular position of the outlet shaft of the trim actuator.

7. The device according to claim 1, wherein the at least one force sensor is arranged mechanically in series relative to the at least one flight control member.

8. The device according to claim 1, wherein the force servo-control loop includes a memory serving to store at least one table of predetermined force values for application to the at least one flight control member as a function of position data transmitted by the at least one second position sensor of the speed servo-control loop.

9. An aircraft, wherein the aircraft includes the control device according to claim 1.

10. A control method for controlling an aircraft including at least one motor-driven trim actuator with active type anchoring, the trim actuator including at least one electric motor, at least one power electronic circuit for electrically powering the at least one electric motor, and speed reduction means for reducing the speed of rotation of an axis of rotation of the at least one electric motor, the speed reduction means serving to drive rotation of an outlet shaft of the trim actuator at an outlet speed of rotation that is less than an inlet speed of rotation of the axis of rotation of the at least one electric motor, wherein the control method comprises three distinct servo-control loops that are nested in one another, the three servo-control loops being formed by an electric current servo-control loop, a speed servo-control loop, and a force servo-control loop, and wherein:
   in the electric current servo-control loop:
   using at least one electric current sensor at the input of the at least one electric motor to measure a value of an electric power supply current delivered by the at least one electronic power circuit; and
   using at least one first position sensor on the axis of rotation of the at least one electric motor to measure an angular position of the axis of rotation relative to a stationary frame of the trim actuator;
   in the speed servo-control loop:
   using at least one second position sensor on the outlet shaft to measure an angular position of the outlet shaft relative to the stationary frame of the trim actuator; and
   an output branch is connected with an input of the electric current servo-control loop; and in the force servo-control loop:
  using at least one force sensor at at least one flight control member to measure an external force exerted on the at least one flight control member; and
  an output line is connected with an input of the speed servo-control loop.

11. The method according to claim 10, wherein the at least one electric motor is of three-phase type and the electric current servo-control loop includes a measurement step using three electric current sensors to measure three values of electric power supply current delivered by the at least one electronic power circuit.

12. The method according to claim 11, wherein at least one computer is used to perform a vector control step for the at least one three-phase electric motor, such a vector control step serving to deliver two orthogonal components: a first component representative of a setting for a magnetic flux of the at least one electric motor, and a second component representative of a setting for a motor torque of the at least one electric motor.

13. The method according to claim 10, wherein the speed servo-control loop includes a calculation step making use of a calculation circuit having as input a first signal representative of the angular position of the outlet shaft of the trim actuator to determine a second signal representative of a speed of rotation of the outlet shaft.

14. The method according to claim 10, wherein the electric current servo-control loop includes a first filtering step using at least one first filter to eliminate interfering frequencies from a signal representative of the angular position of the axis of rotation of the at least one electric motor.

15. The method according to claim 10, wherein the speed servo-control loop includes a second filtering step using at least one second filter to eliminate interfering frequencies from a signal representative of the angular position of the outlet shaft of the trim actuator.

16. The method according to claim 10, wherein the force servo-control loop includes a storage step serving to store at least one table of predetermined force values for application to the at least one flight control member as a function of position data transmitted by the at least one second position sensor of the speed servo-control loop.

* * * * *